Feb. 14, 1961  R. P. RICE, JR  2,971,620
POSITIONING CLUTCH

Filed April 21, 1958  3 Sheets-Sheet 1

INVENTOR.
ROGER P. RICE, JR.
BY
Brumbaugh, Free, Graves & Donohue
his ATTORNEYS

United States Patent Office 2,971,620
Patented Feb. 14, 1961

2,971,620

POSITIONING CLUTCH

Roger P. Rice, Jr., Darien, Conn., assignor to Time, Incorporated, New York, N.Y., a corporation of New York Filed Apr. 21, 1958, Ser. No. 729,642

16 Claims. (Cl. 192—18)

This invention relates to clutch devices and, more particularly, to a new and improved clutch arranged to engage and release at a predetermined angular position.

In apparatus for positioning a member at any of a series of positions, a clutch mechanism linking the member to a drive shaft must operate to engage or disengage the drive shaft only when the member is located at one of the positions. In order to prevent sudden shocks and transmit uniform acceleration to the driven member in systems of this type, the drive shaft may be rotated at a velocity varying sinusoidally from zero to a maximum value during each rotation, the shaft having zero velocity whenever the driven member passes one of the positions in the series. Inasmuch as the drive shaft remains at zero velocity only instantaneously, however, the clutch mechanism must be capable of receiving in advance a signal to engage or release the drive shaft at the next occurrence of zero angular velocity. Furthermore, if the driven member is subject to other forces while at a selected position, the clutch mechanism should operate to lock the member in position whenever the drive shaft is disengaged.

Accordingly, it is an object of this invention to provide a new and improved clutch mechanism capable of engaging or disengaging the drive shaft at a predetermined angular position and operative to lock the driven member in position when the drive shaft is disengaged.

Another object of the invention is to provide a clutch mechanism of the above character adapted to receive actuating signals in advance and respond when the drive shaft attains a predetermined angular position.

These and other objects of the invention are accomplished by including in the clutch mechanism a connecting member movable with the driven member and engageable with the drive shaft when the two attain a predetermined angular relation. Actuating forces to urge the connecting member into and out of engagement are generated by a spring arrangement in accordance with the position of a cocking member movable in response to rotation of the drive shaft. In one embodiment of the invention, the connecting member engages a fixed member when released from the drive shaft and the cocking member is normally retained by a control mechanism in a position urging the connecting member toward the fixed member. In addition, the control mechanism normally holds the connecting member in engagement with the drive shaft but is releasable to permit engagement with the fixed member.

Further objects and advantages of the invention will be apparent from a reading of the following description in conjunction with the accompanying drawings in which.

Figure 1:
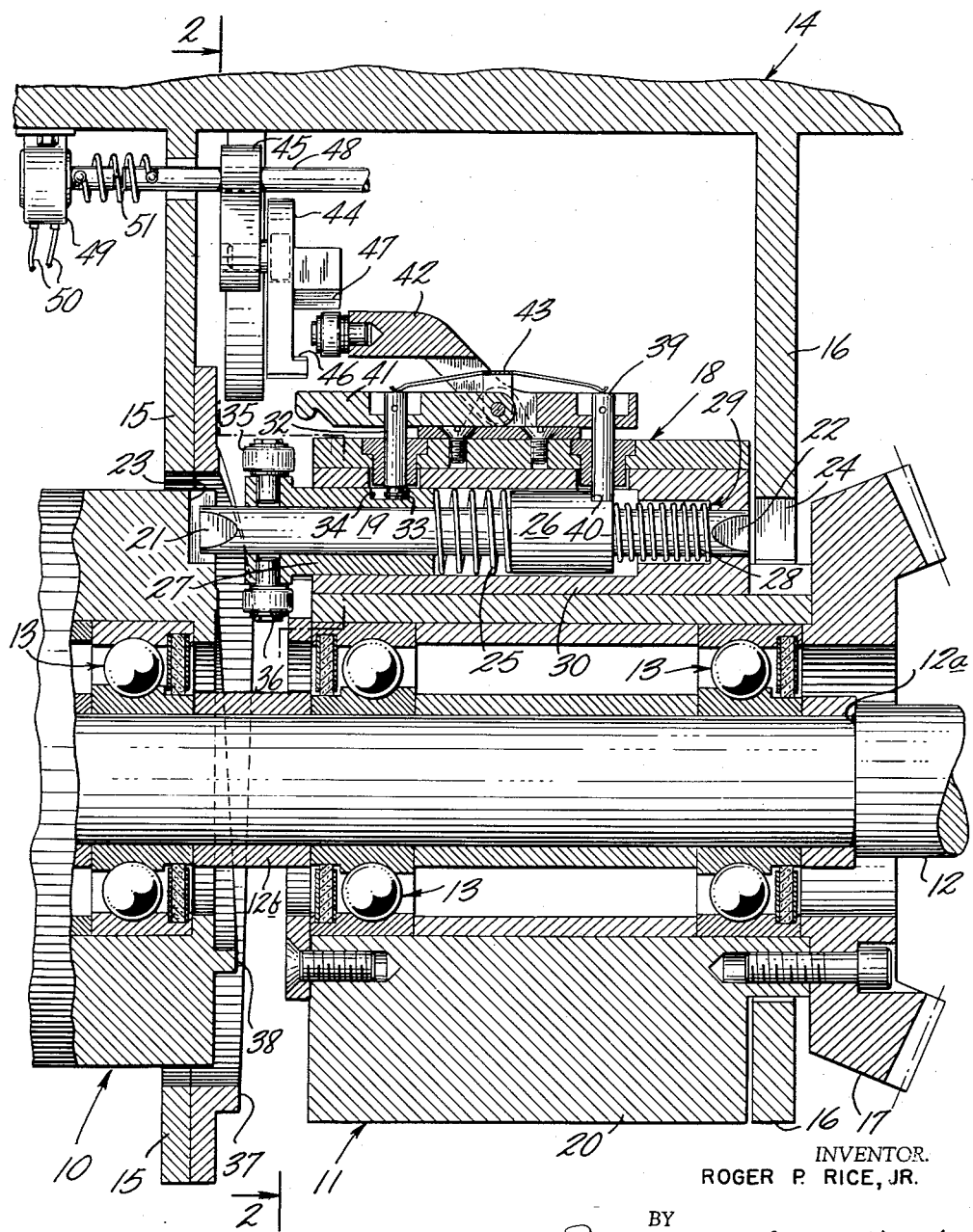
Fig. 1 is a view in vertical axial section of a clutch mechanism arranged according to the invention.
Figure 2:
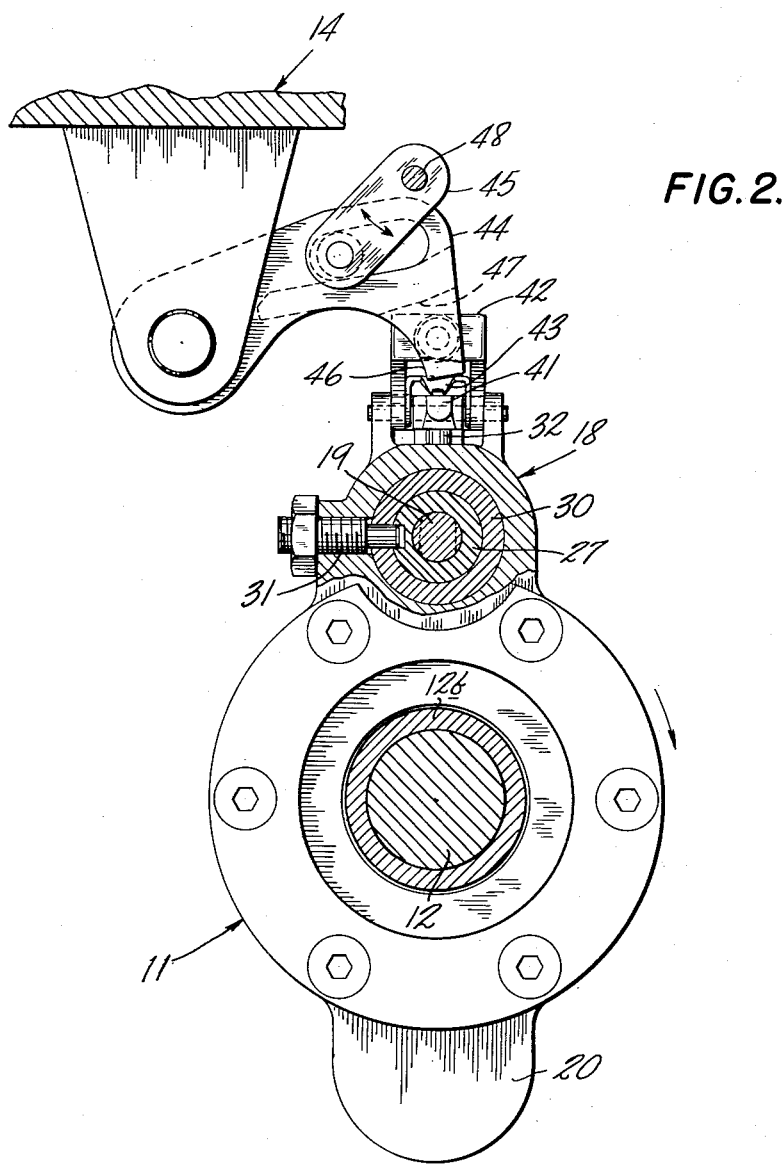
Fig. 2 is an end view partly in section, taken on the lines 2—2 of Fig. 1, showing the clutch mechanism of Fig. 1.

As illustrated in Figs. 1 and 2, a representative clutch mechanism arranged according to the invention comprises an input member 10 and an output member 11, each rotatably mounted on a supporting shaft 12 as by ball bearings 13, for example. In order to accelerate the output member 11 smoothly from a stationary position when the clutch engages, the input member 10 preferably rotates with a variable velocity, the direction of rotation being indicated in the drawings by an arrow. Optimum acceleration conditions are obtained by rotating the input member with a velocity varying sinusoidally from zero to a maximum value and back to zero during each revolution. Surrounding the output member 11, a fixed frame 14 includes walls 15 and 16, each having apertures to receive the rotatable members. Additional walls (not shown), outside the walls 15 and 16, support the shaft 12 and position it with respect to the fixed frame 14. Both the members 10 and 11 are positioned axially on the shaft 12 by virtue of being urged to the right against a shoulder 12a on shaft 12, a spacer 12b being included to maintain constant separation of the two members. Outside the wall 16, the output member 11 carries an output gear 17 to drive a driven member (not shown) along a series of spaced positions when the clutch is engaged, the linkage therebetween being arranged so that the input member is at its zero velocity position when the driven member passes each position.

Between the end walls 15 and 16, a radially projecting portion 18 of the output member 11 carries a connecting member such as a drive pin 19 which is slideably mounted parallel to the axis of rotation, a counterweight 20 being mounted on the output member at a position diametrically opposite the projecting portion 18. At each end of the drive pin 19 tapered tips 21 and 22 are shaped to fit into complementary slots 23 and 24 in the input member 10 and the fixed wall 16, respectively, to lock the output member in a driven or a stationary condition. Each of the slots 23 and 24 extends perpendicularly to the axis of rotation of the system and both are positioned to be in line with the drive pin 19 when the input member 10 is at its position of zero angular velocity and the output member 11 is at one of its series of positions. Inasmuch as the drive pin 19 always engages either one or the other of the slots 23 and 24 during operation, the pin 19 is slightly longer than the distance between the inside edges of the slots but short enough to disengage either of the slots when the other is fully engaged.

Surrounding the drive pin 19, a primary coil spring 25 extends between one end of a cylindrical block 26 secured to the pin and a cocking plunger 27 surrounding the pin, while a secondary spring 28 extends in the other direction from the opposite end of the block 26 to a shoulder 29 formed in a sleeve 30 which slideably receives the pin and the plunger 27. As best seen in Fig. 2, the plunger 27 is retained in fixed angular position within the sleeve 30 by a pin 31 mounted in the side of the projecting portion 18 and extending inwardly into a longitudinal slot in the plunger. Inasmuch as the tapered tips 21 and 22 are always in engagement with one or the other of the slots 23 and 24, the drive pin 19 is always held so that the tapered tips both extend perpendicularly to the axis of rotation of the output member.

Referring to Fig. 1, wherein the clutch is shown in the engaged condition, it will be observed that the secondary spring 28 urges the block 26 and the drive pin 19 to the left within the sleeve 30, while the primary spring 25 tends to force the drive pin to the right and the cocking plunger 27 to the left. These spring forces are controlled by positioning the cocking plunger 27 so that the net force acting on the drive pin at any time urges it in the desired direction. To this end, the two springs are selected so that the primary spring has a rate approximately twice that of the secondary spring and is compressed to overcome the secondary spring and force the pin 19 to the right, as viewed in Fig. 1, when the cocking plunger 27 is in its right-hand, or cocked, position. In order to retain the cocking plunger in this position, a control pin 32, formed with a lip 33 at its lower end, extends through the sleeve 30 and fits into a recessed hole 34 in the plunger. When the pin 32 is withdrawn from the hole 34, the cocking plunger can move to the left, expanding the primary spring 25 so that the force of the secondary spring 28 exceeds that of the primary spring and urges the drive pin to the left.

Control of the leftward motion of the cocking plunger 27 and its return to the cocked position is accomplished by two rollers 35 and 36, rotatably mounted on the plunger with their axes perpendicular to the axis of the output member 11. These rollers are positioned on the plunger to roll against the surfaces of a fixed cam 37 mounted on the wall 15 and an input cam 38 formed on the adjacent face of the input member 10, respectively. As shown graphically in Fig. 3, each of the cams 37 and 38 is formed to drive the plunger 27 to the right as viewed in Fig. 1 during the first three-quarters of each rotation from the zero velocity position of the input member until the plunger clears the lip 33 so that the control pin 32 may be withdrawn. The receding surfaces of the cams permit the plunger to move to the left during the last one-quarter revolution so that it attains an extreme leftward position just prior to the moment of zero velocity of the input member if the control pin 32 has been withdrawn. Thus, when the clutch is engaged, as shown in Fig. 1, the output member 11 turns with the input member 10 and the roller 35 can follow the fixed cam 37. On the other hand, when the drive pin 19 is to the right, disengaging the clutch and holding the output member 11 stationary, the roller 36 can follow the input cam 38. In order to hold the drive pin 19 to the left in engagement with the slot 23 of the input member 10 when the cocking plunger 27 is moved to the right, a trigger pin 39, slideably supported in the sleeve 30, extends toward the drive pin 19 to fit into a notch 40 in the block 26. When the trigger pin is in the notch 40, it will be noted that the drive pin 19 cannot be moved to the right to engage the fixed slot 24 even though the cocking plunger 27 is in the cocked position.

Each of the pins 32 and 39 extends through the top of the projecting portion 18 where the control pin is pivotally attached to a control lever 41 and the trigger pin 39 is similarly attached to a trigger lever 42, both pins being normally urged toward the drive pin 19 by a leaf spring 43. In order to actuate the control lever 41 and lift the control pin 32 away from the sleeve 30, a control arm 44, rotatably mounted on the frame 14, is adapted to be raised and lowered by rotation of an actuator arm 45 linked to the control arm by a pin-and-slot arrangement, the raised position being illustrated in the drawings. Extending from the bottom of the control arm 44, a finger 46 projects adjacent the end of the control lever 41 and rests below the control lever when the control arm 44 is in the lowered position and above this lever when the arm is in the raised position. As best seen in Fig. 2, the finger 46 is radially in line with the end of the control lever 41 when the output member 11 is in the stationary position, thus enabling this lever to be lifted by motion of the control arm from the lowered to the raised position. In addition, a cam surface 47 projects from the control arm and is formed to depress the trigger lever 42, raising the pin 39, when the output member 11 rotates toward the zero velocity position with the control arm 44 lowered. When the control arm 44 is in its raised position, the cam surface 47 is held away from the trigger lever 42, permitting the output member to pass through the zero velocity position with the pin 39 engaged in the notch 40.

In order to raise the control arm 44 and thereby actuate the control lever 41, conditioning the clutch mechanism to engage, an actuator shaft 48, rotatably supported on the frame 14, extends from the actuator arm 45 to a rotary solenoid 49 energizable through two conductors 50, the rotary motion being transmitted from the solenoid to the shaft 48 through a torsion spring 51. It will be apparent that the control lever 41 cannot be lifted by the finger 46 to withdraw the control pin 32 and release the cocking plunger 27 from the cocked position except when the plunger is moved farther to the right to disengage the lip 33. As pointed out above, this condition occurs only when the input member has completed approximately three-quarters of a revolution from its zero velocity position, the plunger being driven to the right by the cam 38. Therefore, actuating signals received from the line 50 to energize the solenoid 49 at any other time cock the torsion spring 51 when received but do not raise the control arm 44 until the cocking plunger is moved to the right.

In operation, the clutch mechanism, which is illustrated in the drawings in the engaged position with the control solenoid 49 energized, is released by terminating the energization of the control solenoid. This permits the actuator arm 45 to rotate to a vertical orientation as seen in Fig. 2, dropping the control arm 44 to its lower position where it is held by the pin-and-slot arrangement connecting these elements. The next time the output member 11 approaches the zero velocity position, the end of the trigger lever 42 is depressed by the lowered cam surface 47, raising the trigger pin 39. As soon as this pin is withdrawn from the notch 40, the cocked primary spring 25 forces the drive pin 19 to the right, as viewed in Fig. 1, against the end wall 16. In this position, the tip 21 of the drive pin is still within the input member slot 23 constraining the output member to turn with the input member until the tip 22 lines up with the fixed slot 24 and is driven into this slot by the force of the primary spring. As long as the cocking plunger is retained to the right by the control pin 32, the net force of the springs 25 and 28 urges the drive pin 19 to the right, thus retaining the output member 11 in a stationary condition and holding the driven member (not shown) at a selected position in the series.

Figure 3:
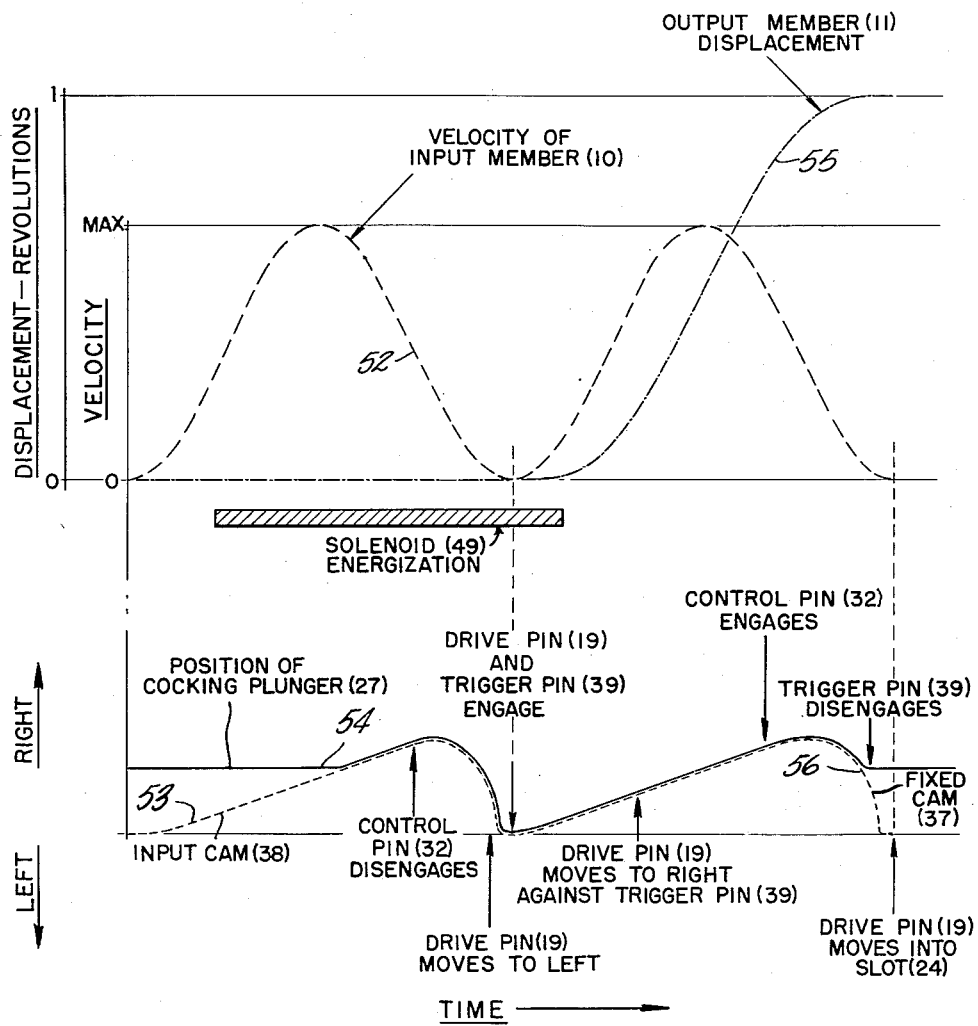
Fig. 3 is a graphical representation illustrating the relative motion of various elements shown in Figs. 1 and 2 during the operation of the clutch mechanism.

Referring to Fig. 3, the operation of the clutch mechanism during a typical cycle, wherein the input member is engaged to drive the output member through one revolution and then released, is illustrated graphically. With the clutch disengaged, the input member, rotating with a sinusoidally varying velocity represented by the curve 52, turns the input cam 38 so that the surface adjacent the cocking plunger 27, represented by the dotted line 53, contacts the plunger and moves it to the right after about three-quarters of a turn, the plunger position being indicated by the solid line 54. If the solenoid 49 is energized at this time, the control pin 32 is withdrawn by the control arm 44 which raises the control lever 41 as soon as the lip 33 is free. The cocking plunger then moves to the left under the influence of the primary spring 25, following the input cam surface. As the plunger approaches the input member 10, expansion of the primary spring permits the secondary spring 28 to force the drive pin 19 to the left and as the drive pin enters the slot 23 at the zero velocity position of the input member, the trigger pin 39 drops into the notch 40, retaining the drive pin in the engaged position.

In this condition, the output member 11 is gradually accelerated and rotates with the input member following the curve 55 of Fig. 3. Meanwhile, the plunger 27, which now remains adjacent the lowest point of the input cam 38 is driven to the right by the fixed cam 37, represented in the drawing by the dotted line 56. This action compresses the primary spring 25, shifting the net force on the drive pin 19 to the right but the pin, being retained in the slot 40 by the trigger pin 39, moves only slightly to the right. When the cocking plunger 27 has moved far enough to the right, the control pin 32 is pressed into the hole 34 by the leaf spring 43 to maintain the plunger in the cocked position. With the solenoid 49 deenergized the cam surface 47, in its lower position, depresses the trigger lever 42 as the output member approaches the zero velocity position. This raises the trigger pin 39 so that the drive pin is driven to the right against the wall 16 and into the slot 24 when the zero velocity position is reached.

Although the invention has been described herein with reference to a specific embodiment, many modifications and variations therein will be apparent to those skilled in the art. Accordingly, the invention is not intended to be restricted in scope except as defined by the following claims.

I claim:

1. A positioning clutch comprising rotary input means, rotatably mounted output means, connecting means movable between first and second positions and adapted to complete a driving connection between the input means and the output means in the first position, spring means arranged to urge the connecting means in either direction between the two positions according to the position of spring cocking means, spring cocking means movable between two positions in accordance with the angular position of the input means to cock the spring means so that the connecting means is urged thereby toward its first position when the input member is at a first predetermined angular position and toward its second position at a second predetermined angular position of the input member, and control means normally retaining the cocking means in the position urging the connecting means toward its second position and actuable to permit the cocking means to move to the position urging the connecting means toward its first position.

2. A positioning clutch comprising rotary input means, rotatably mounted output means, connecting means movable between first and second positions and adapted to complete a driving connection between the input means and the output means in the first position, spring means arranged to urge the connecting means in either direction between the two positions according to the position of spring cocking means, spring cocking means movable between two positions in accordance with the angular position of the input means to cock the spring means so that the connecting means is urged thereby toward its first position when the input member is at a first predetermined angular position and toward its second position at a second predetermined angular position of the input member, and control means normally retaining the cocking means in the position urging the connecting means toward its second position and normally retaining the connecting means in its first position and selectively actuable to release the connecting means or permit the cocking means to move to the position urging the connecting means toward its first position.

3. A positioning clutch comprising rotary input means, rotatably mounted output means, connecting means movable between first and second positions and adapted to complete a driving connection between the input means and the output means in the first position, spring means arranged to urge the connecting means in either direction between the two positions according to the position of spring cocking means, spring cocking means movable between two positions in accordance with the angular position of the input means to cock the spring means so that the connecting means is urged thereby toward its first position when the input member is at a first predetermined angular position and toward its second position at a second predetermined angular position of the input member, and control means normally retaining the cocking means in the position urging the connecting means toward its second position and normally retaining the connecting means in its first position and actuable in response to receipt of an electrical signal to permit the cocking means to move to the position urging the connecting means toward its first position and in response to termination of the signal to release the connecting means.

4. A positioning clutch comprising rotary input means, rotatably mounted output means, connecting means movable between first and second positions and adapted to complete a driving connection between the input means and the output means in the first position, spring means arranged to urge the connecting means in either direction between the two positions according to the position of spring cocking means, spring cocking means movable between two positions in accordance with the angular position of the input means to cock the spring means so that the connecting means is urged thereby toward its first position when the input member is at a first predetermined angular position and toward its second position at a second predetermined angular position of the input member, and control means including first locking means in the output means normally retaining the cocking means in the position urging the connecting means toward its second position, second locking means in the output means normally retaining the connecting means in its first position, and a control arm movable in response to an electrical signal to release the first locking means and in response to termination of the signal to release the second locking means.

5. A positioning clutch according to claim 4 wherein the first locking means is releasable only when the input means is at the second predetermined angular position and wherein the second locking means is releasable when the input means is at the first predetermined angular position.

6. A positioning clutch according to claim 4 including a fixed frame adjacent the connecting means having recess means and wherein the connecting means engages the recess means in the fixed frame in its second position.

7. A positioning clutch according to claim 4 wherein the input means rotates with variable angular velocity and has substantially zero velocity at the first predetermined angular position.

8. A positioning clutch according to claim 7 wherein the input means rotates with sinusoidally varying angular velocity.

9. A positioning clutch comprising rotary input means having recess means spaced from the axis of rotation, rotatably mounted output means arranged to transmit motion from the input means when the clutch is engaged, connecting means included in the output means movable between a first position engaging the recess means of the input means and completing a driving relation therewith and a second position spaced therefrom, spring means adapted to urge the connecting means in either direction between the two positions according to the position of spring cocking means, spring cocking means movable between two positions in response to rotation of the input means to cock the spring means so that the connecting means is urged thereby in the direction to engage the recess means when the input means is at a predetermined angular position and in the opposite direction when it is at a second angular position, and control means normally retaining the connecting means in the position engaging the recess means and the cocking means in the position urging the connecting means away from the recess means adapted to selectively release the connecting means when the input means is at the predetermined angular position and the cocking means when the input means is at the second angular position.

10. A positioning clutch according to claim 9 wherein the spring means includes a first spring extending between the connecting means and the output means and a second spring opposed to the first extending between the connecting means and the spring cocking means.

11. A positioning clutch according to claim 9 wherein the input means includes a cam surface adapted to drive the cocking means when the connecting means is in its second position and including a fixed cam surface adapted to drive the cocking means when the connecting means is in its first position.

12. A positioning clutch according to claim 9 including a fixed frame having recess means wherein the connecting means engages the fixed frame recess means in its second position.

13. A positioning clutch according to claim 9 wherein the input means rotates with variable angular velocity and has substantially zero velocity at the predetermined angular position.

14. A positioning clutch according to claim 13 wherein the input means rotates with sinusoidally varying angular velocity.

15. A positioning clutch according to claim 9 wherein the control means includes solenoid means energizable at any time and actuating means responsive to energization of the solenoid means to release the cocking means when the input means is at its second angular position.

16. A positioning clutch according to claim 15 wherein the actuator means is responsive to deenergization of the solenoid means to release the connecting means when the input means is at the predetermined angular position.

References Cited in the file of this patent

UNITED STATES PATENTS

| | | |
|---|---|---|
| 2,779,446 | Bell | Jan. 29, 1957 |
| 2,803,323 | Newell | Aug. 20, 1957 |
| 2,901,068 | Tipper | Aug. 25, 1959 |